Sept. 16, 1952 P. E. GELDHOF ET AL 2,610,498
LAUNDERING MACHINE
Filed Nov. 20, 1947 9 Sheets-Sheet 9
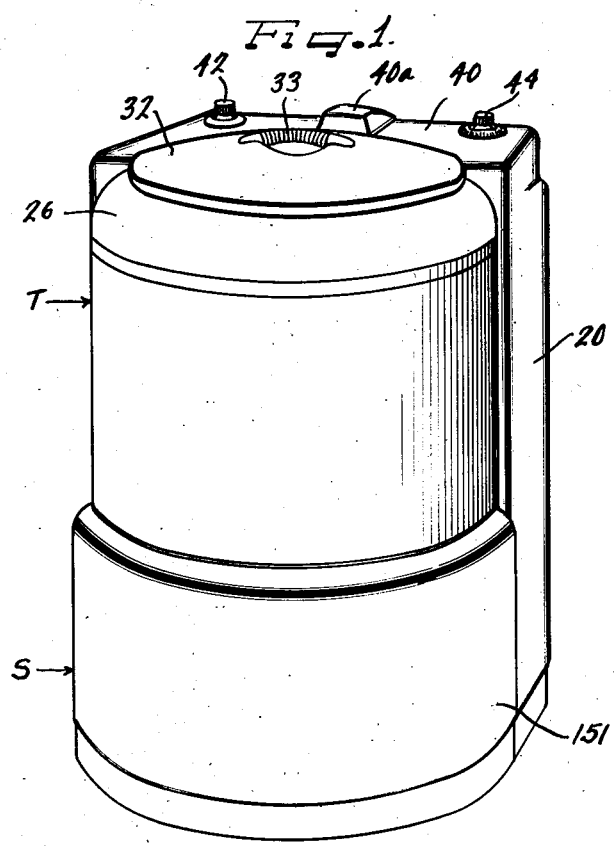
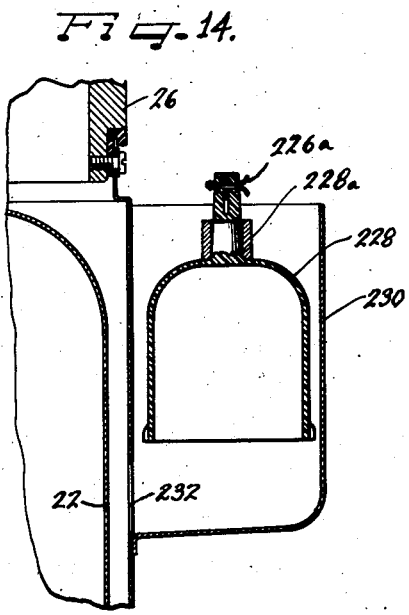
Inventors
PETER EDUARD GELDHOF
LUTHER RINGER
by The Firm of Charles W. Hills Attys.

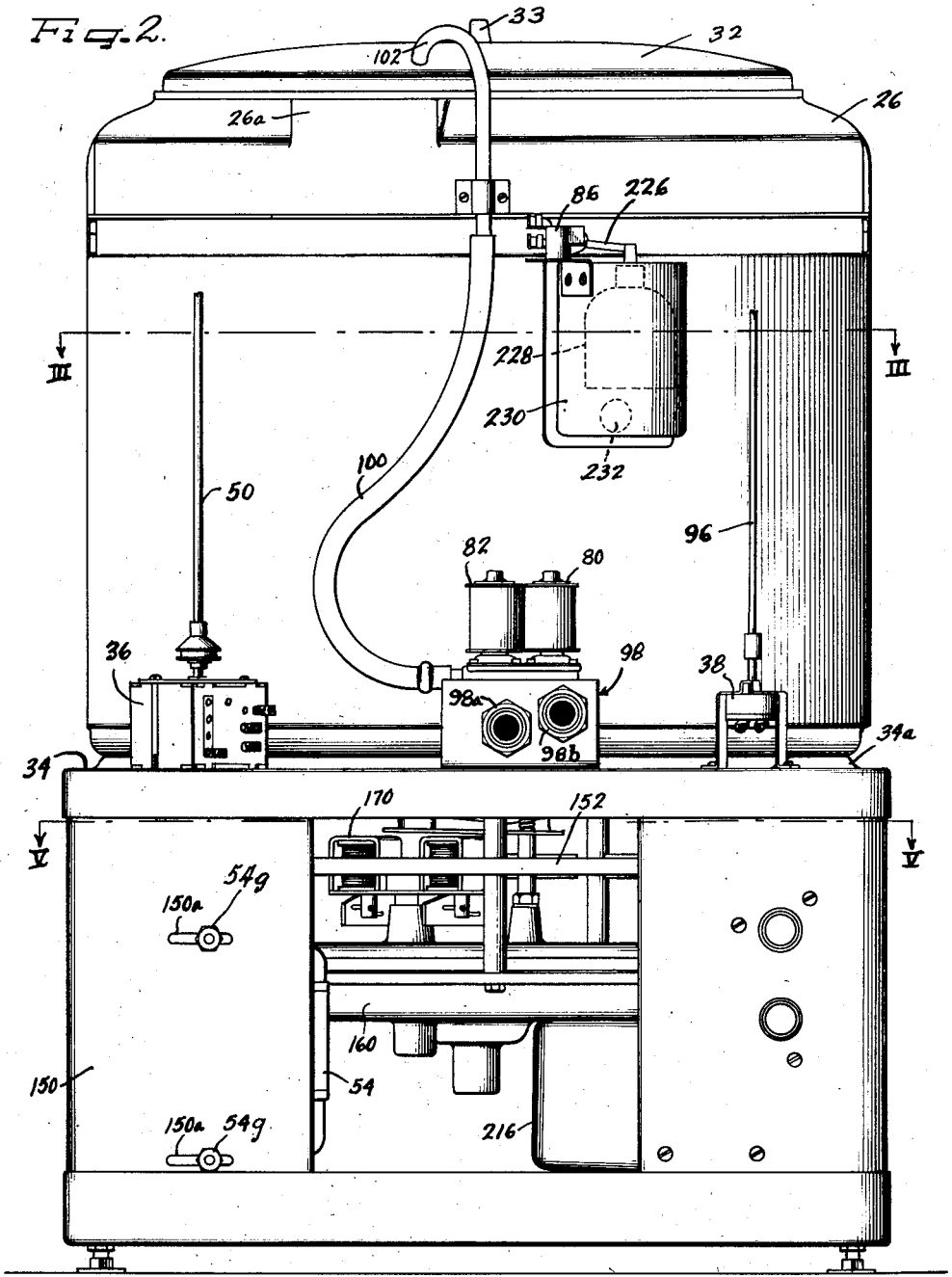

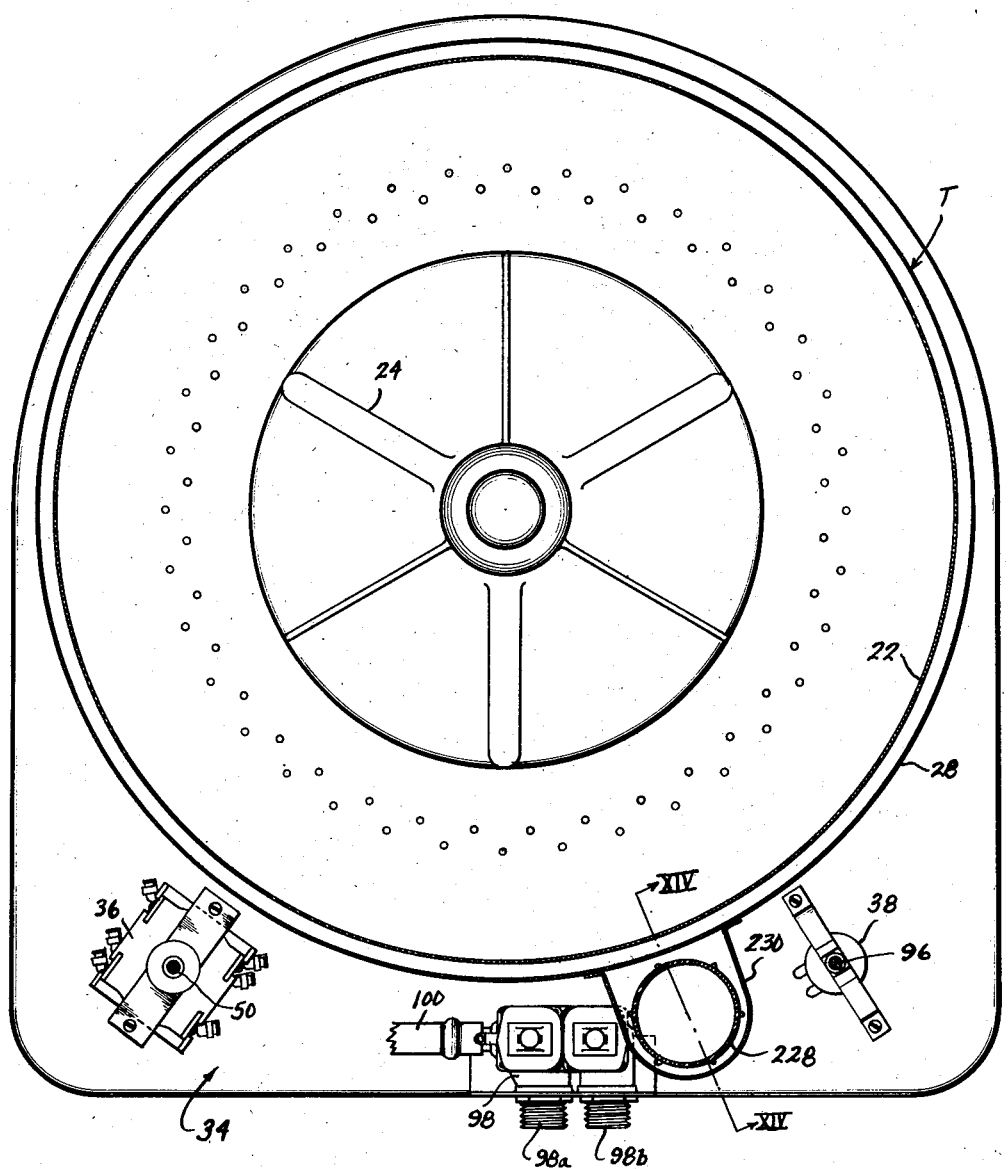

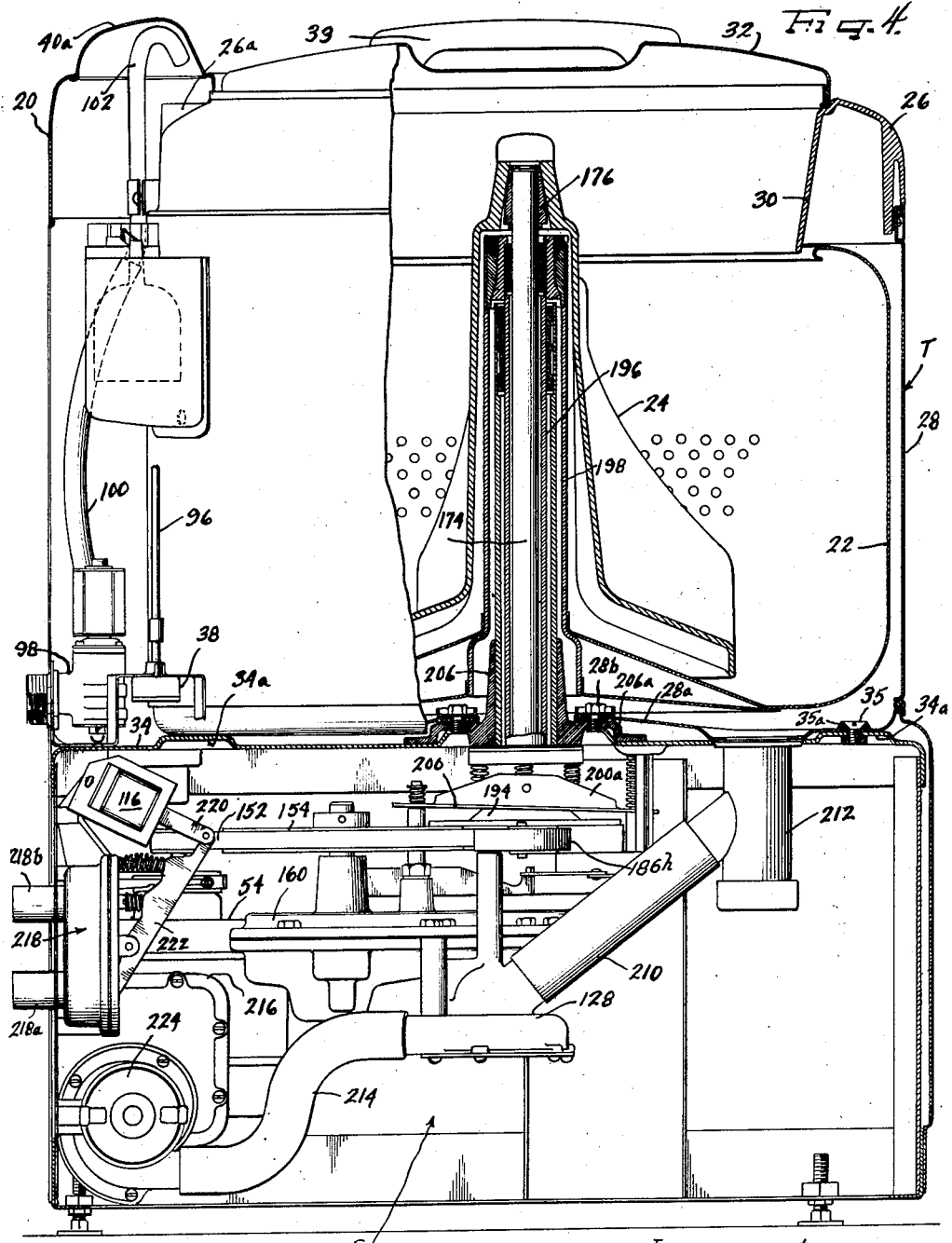

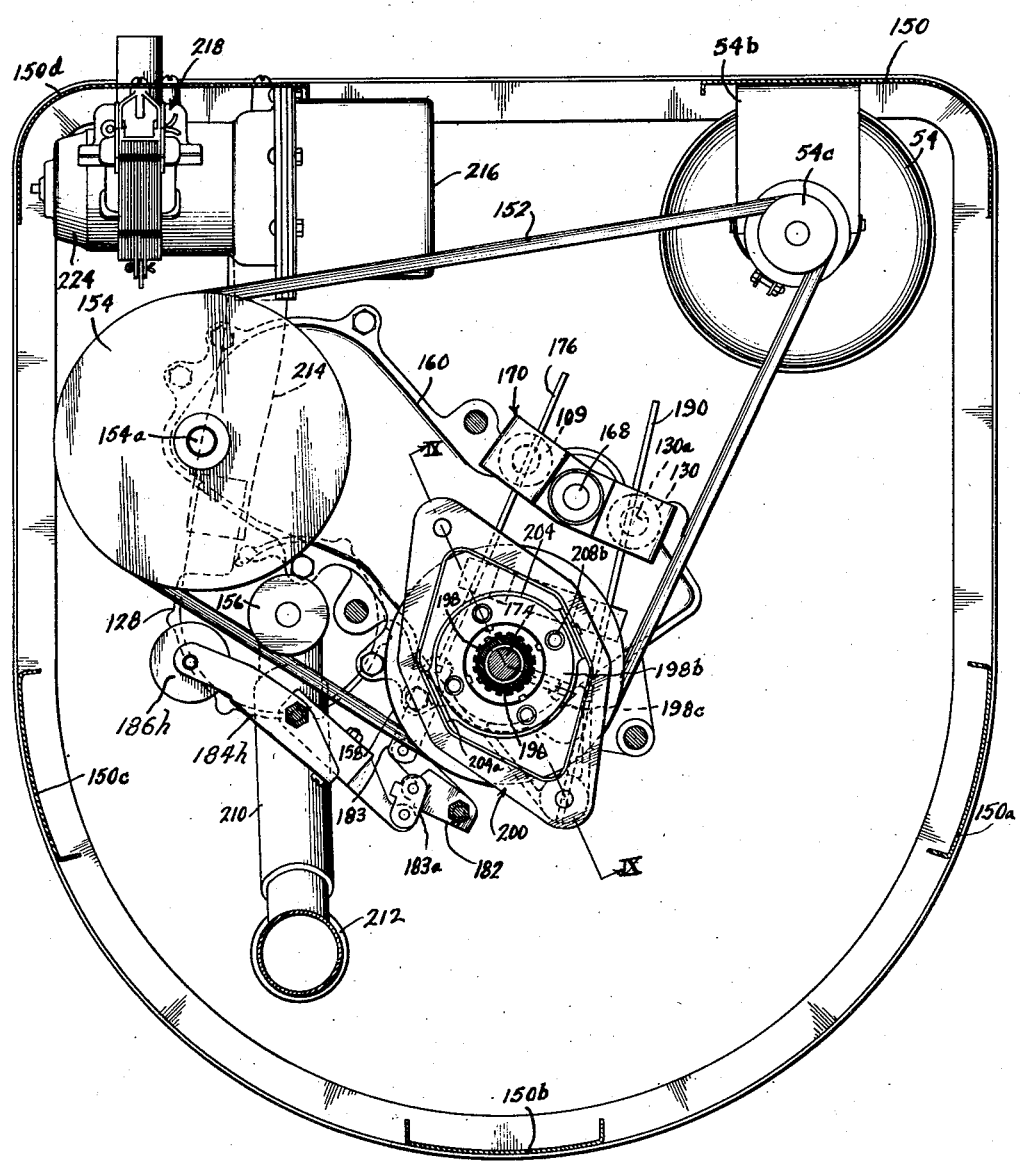

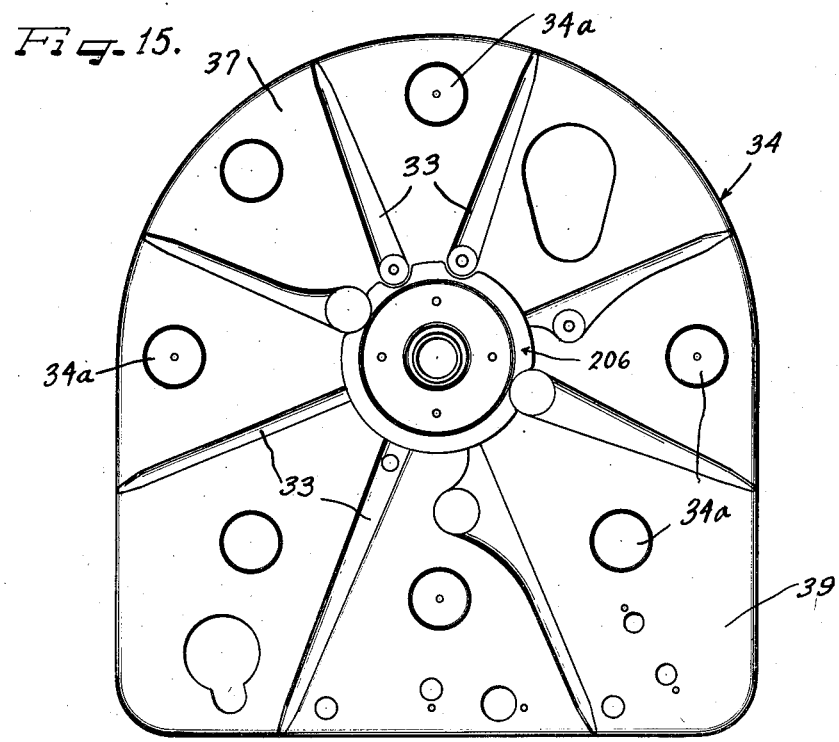
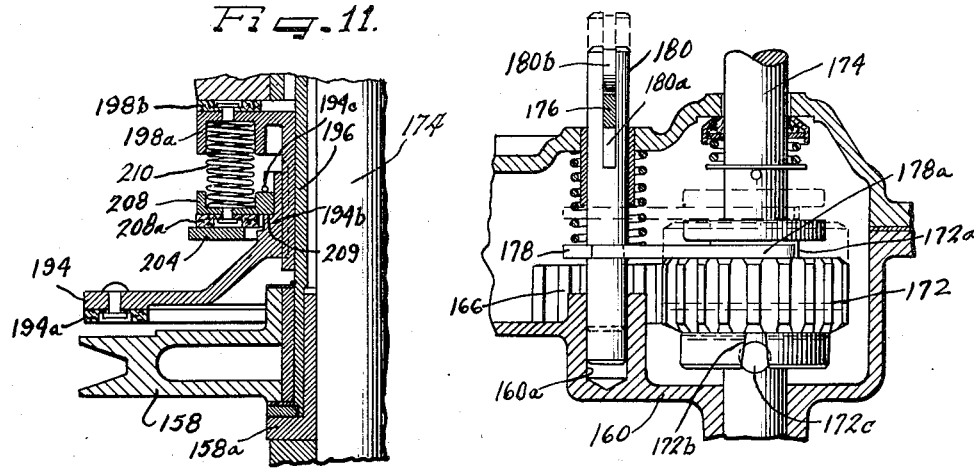

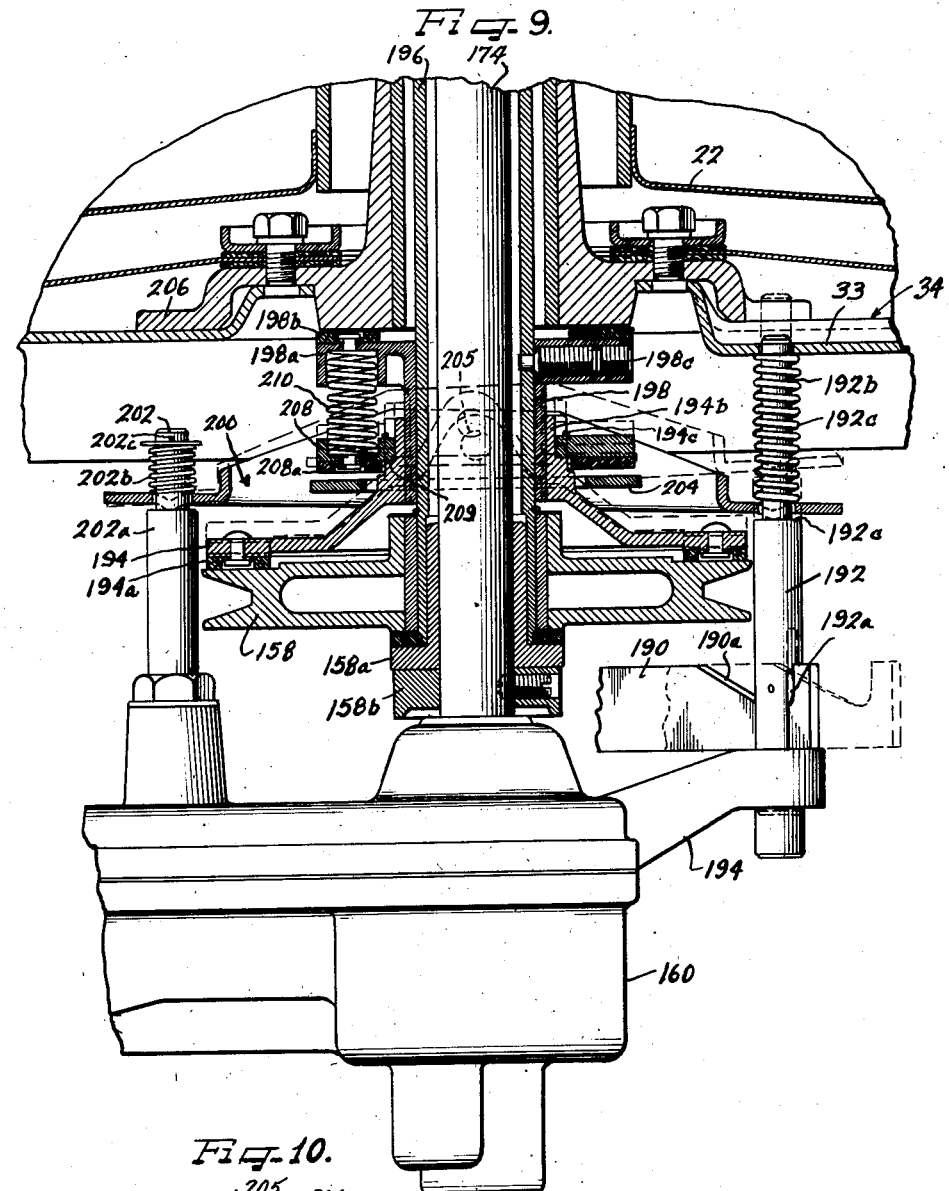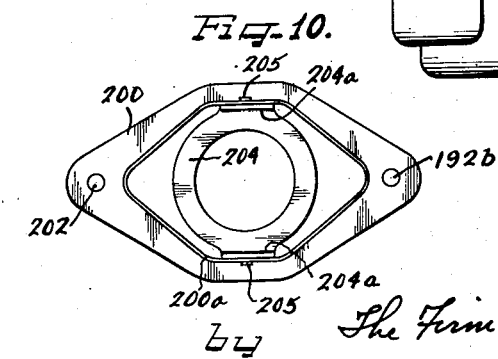

Patented Sept. 16, 1952

2,610,498

UNITED STATES PATENT OFFICE 2,610,498

LAUNDERING MACHINE

Peter Eduard Geldhof and Luther Ringer, St. Joseph, Mich., assignors to Whirlpool Corporation, a corporation of New York Application November 20, 1947, Serial No. 787,060

2 Claims. (Cl. 68—23)

This invention relates to automatic clothes washing, rinsing, and drying machines and more particularly to an improved structure therefor.

In one form of automatic laundering machine, mechanism is provided whereby the user may insert clothes or other objects to be laundered, set the controls of the machine to initiate the laundering cycle, and return at a later time to find the clothing or other objects completely cleansed, and rinsed and the preliminary drying or water extracting operation performed. Such mechanism is of particular utility for home use as it relieves the burdensomeness of laundering or cleaning processes and obviates the necessity of constant attention on the part of the user.

In the machine of the present invention a tub is provided in which is rotatably mounted a cylindrical clothes supporting basket. In addition, an agitator is mounted for oscillatory movement within the basket. Mechanism is provided to drive the agitator in oscillating movements for washing and rinsing clothes in the basket when the tub is filled with water and to rotate the basket at high speed to extract water centrifugally from the clothes when the tub has been drained. Automatic control elements are provided to fill the tub, energize the agitator for clothes washing movements, empty the tub, energize the basket for preliminary extracting movements to remove the wash water from the clothes, spray fresh water on the clothes during the end of this preliminary water extracting movement, fill the tub with fresh rinse water, energize the agitator to assure complete exposure of the clothing or other objects to the rinse water, drain the tub, and finally to rotate the basket to complete the water extracting or drying operation.

In accordance with the present invention the tub is of cylindrical shape and is mounted upon a support structure with its axis vertical. The shafts for driving the agitator and basket extend below the tub and are interconnected with drive and control elements located in the support structure. The support structure is of semi-cylindrical shape at its forward portion and blends into the cylindrical shape of the tub. At its rear portion, the support structure is rectangular in shape. A horizontally disposed base plate extends beneath the tub and back to the rear portion of the unit to form a shelf upon which the control switches and valves are mounted.

Further in accordance with the present invention the basket is selectively driven or braked through an axially movable rotating member on the shaft thereof which in one extreme of movement causes driving engagements and in the other extreme of movement causes braking engagements. When it is desired to drive the basket, this member is axially shifted frictionally to engage the main drive mechanism to form a slipping clutch engagement that limits the torque applied to the driving mechanism during the time the basket is being brought up to speed. This torque limitation enables the use of a motor having low starting and pull-out torque without danger of stalling and, in addition, eliminates the need for automatic devices to indicate when the tub is empty since the clutch mechanism may be engaged when there is water in the tub and the slipping action of the clutch limits the torque applied to the driving mechanism.

In accordance with the present invention, a hook-shaped tube extends over the edge of the tub to supply water thereto. This tube is connected at one end to the automatic fluid mixing valve which is disposed on the horizontal plate of the support structure and extends over the edge of the tub to a level well above the maximum height of the fluid therein. By this means an inexpensive, reliable, method of filling the tub is provided, and in addition the possibility of dirty wash water backing up into the water supply pipes is eliminated.

In accordance with another feature of the present invention the laundering machine is provided with automatic control elements operable in one position to cause the agitator to operate only when the water level in the tub exceeds a predetermined minimum and in another position to energize the agitator for operation regardless of the water level in the tub. Automatic timing mechanism is provided to shift the control elements from one position to the other under normal laundering operations but, when desired, the control elements may be shifted manually to permit washing with the tub partially filled with water. This feature is desirable when the machine is used to wash a small number of clothes not justifying the use of a full tub of water or requiring as long a time period for washing as in the case of a full load of clothing.

A structure having features in common with the features of the present invention is described and claimed in the pending application of Peter Eduard Geldhof and Luther Ringer, entitled "Automatic Washing, Rinsing and Drying Machine," Serial No. 491,618, filed June 21, 1943, now Patent No 2,521,159, and assigned to the same assignee as the present invention.

It is, accordingly, a general object of the present invention to provide an improved automatic laundering machine.

A further object of the present invention is to provide an improved automatic laundering machine wherein a simple and inexpensive support structure affords a convenient, accessible and effective support for the automatic portions of the equipment.

Another object of the present invention is to provide an improved automatic laundering machine wherein the automatic elements are easily exposed for repair or replacement.

Still another object of the present invention is to provide an improved automatic laundering machine wherein the base portion provided to support the tub also cooperates with the tub to form a unit that is readily enclosed by a suitable shroud and skirt to form a simple and artistic structure having a clean, attractive appearance.

Yet another object of the present invention is to provide an improved laundering machine wherein a relative low starting and pull-out torque motor may be used but in which a minimum of automatic level controls are required.

Another object of the present invention is to provide an improved laundering machine wherein clutch elements are interposed between the driving mechanism and the rotatable basket portion to limit the torques exerted on the driving mechanism.

Yet another object of the present invention is to provide an improved clothes laundering machine which normally operates with a predetermined quantity of water during the washing process but may optionally be operated with a smaller quantity of water to accommodate a relatively small quantity of clothes.

Still another object of the present invention is to provide an improved clothes laundering machine having automatic control elements operable to conduct the laundering cycle with a predetermined quantity of water but which may be operated manually to cause the laundering cycle to progress with a smaller quantity of water.

It is yet another object of the present invention to provide an improved automatic laundering machine wherein there is no possibility of the washing water backing up by syphon or other action into the water system to which it is connected.

Our invention further resides in features of construction, combination and arrangement whereby an improved automatic laundering machine having attractive appearance, minimum cost, maximum ease of maintenance, and a maximum degree of reliability is achieved.

The novel features which we believe to be characteristic of our invention are set forth with particularity in the appended claims. Our invention itself, however, both as to its organization and method of operation will best be understood by reference to the following description taken in connection with the accompanying drawings.

In the drawings:

Figure 1 is an isometric view from the front of a complete automatic laundering machine constructed in accordance with the principles of the present invention;

Figure 2 is a rear elevational view of the mechanism of Figure 1 with the shroud and portions of the rear cover removed to expose portions of the control elements to view;

Figure 3 is a cross-sectional view of the mechanism of Figure 1 taken along the axis III—III, Figure 2;

Figure 4 is a side elevational view of the mechanism of Figure 1 with portions of the shroud broken away to show the various components of the mechanism, and the spindle and associated parts in cross-section to show the construction of the agitator and basket and the drive mechanism therefor;

Figure 5 is a cross-sectional view through the axis V—V, Figure 2, showing a plan view of the motor drive mechanism of the laundering machine;

Figure 7 is a fragmentary cross-sectional view through the axis VII—VII, Figure 6;

Figure 9 is an enlarged fragmentary cross-sectional view through the axis IX—IX, Figure 5, and showing some parts in side elevation;

Figure 10 is a top plan view of the yoke and annular disk portions of the present invention;

Figure 11 is a fragmentary cross-sectional view like Figure 6 but showing the clutch member in the disengaged condition;

Figure 14 is a cross-sectional view of the float structure of the laundering machine taken through axis XIV—XIV, Figure 3; and Figure 15 is a top plan view of the support plate structure of the present invention.

As shown on the drawings:

Figure 6:
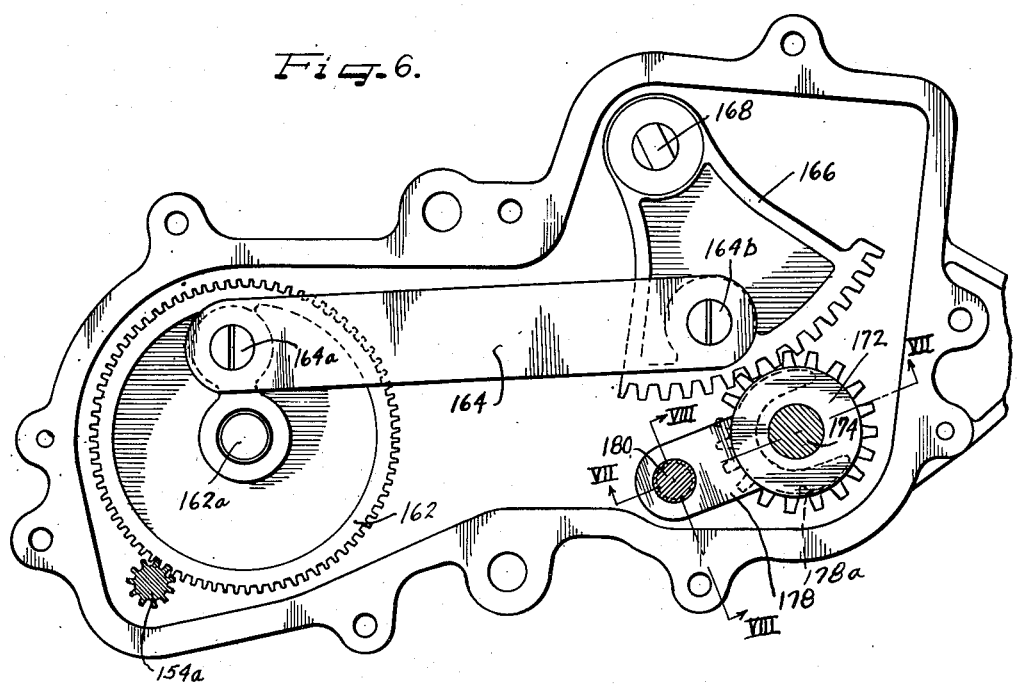
Figure 6 is a fragmentary top plan view of the gear casing with the cover removed to show portions of the gear drive mechanism for the agitator and basket portions of the machine of the present invention.

The laundering machine comprises a tub portion T which defines a clothes laundering chamber and is supported by the support structure S. The support structure S is covered in its rear portion by a shroud 20 which extends upwardly behind the tub T to enclose the operating structures extending up to the top of the unit. The outer covering of the support S snugly fits the tub T to form a sanitary and attractive shape as will be evident from the figure. The portions of the tub and support structure exposed to view and the shroud are given a coating of vitreous enamel or similar material to present an attractive readily washed surface.

The tub T contains a cylindrical inner rotatably mounted clothes container or basket 22, Figure 4, together with an agitator 24 mounted concentrically therewith for oscillating motions during clothes washing and rinsing. An upper housing structure 26 is attached to the upper periphery of the cylindrical outer tub structure 28, Figure 4, and is of generally annular shape with an inner downwardly extending chute portion 30 to guide clothes or other objects into the basket 22. A circular cover or cap 32 fits on the upper portion of the structure 26 and is provided with a handle 33 to facilitate removal thereof to place clothes in the machine or to remove the same therefrom.

The support structure S, Figure 1, sustains the tub portion T in position and, in addition, contains the mechanical drive elements for the basket 22 and the agitator 24 contained therein. This structure further includes a horizontal plate 34, which not only forms a support directly underneath the tub portion T but also extends backwardly to form a mounting plate upon which the cycle control switch 36, Figure 2, the temperature control switch 38, Figure 2, and the fluid temperature control valve 98, Figure 2, are mounted. Stamped metal sheets are formed to provide shrouds 20 and 151 encompassing the portions of the support structure S located underneath the tub T and covering the rear portions of the support structure S. Moreover, the shroud 20 forms a horizontal top surface 40, Figure 1, in horizontal alignment with the cover 32 of the tub portion T. Operating handles 42 and 44 for the temperature control switch 38 and the cycle control switch 36, respectively, extend through this top surface of shroud 20 to provide a convenient readily adjustable means for controlling the operation of the laundering machine.

Operation

Figures 12, 13:
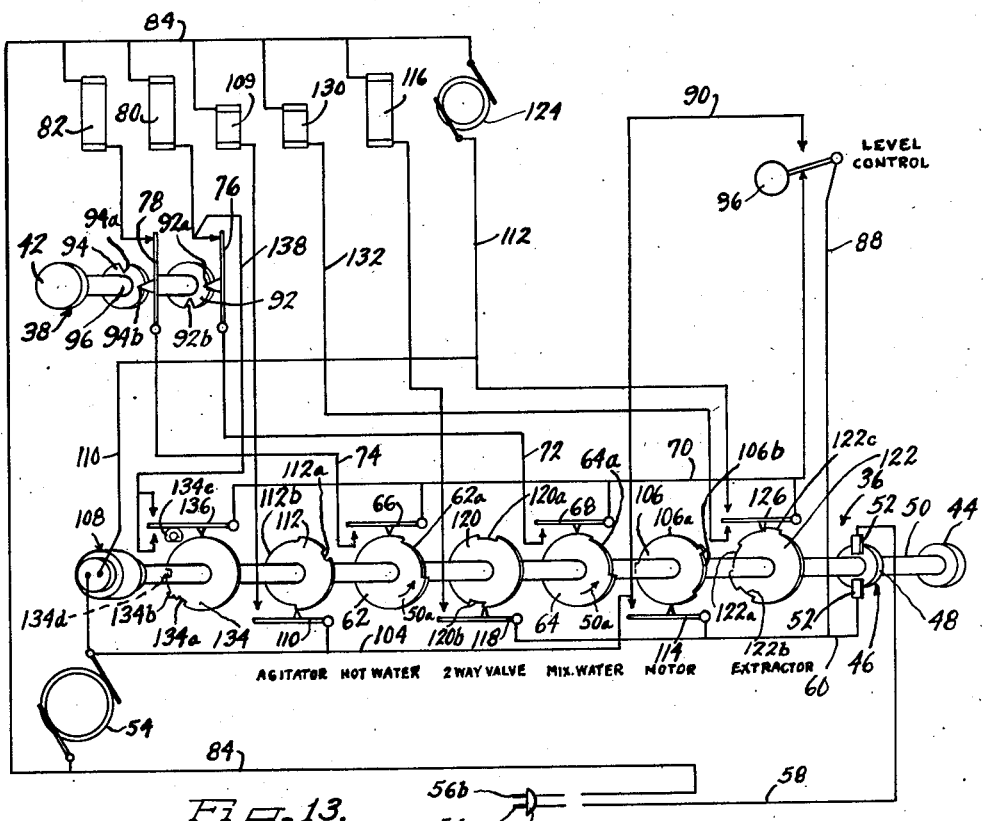
Figure 12 is a diagrammatic illustration showing the cycle of operation of the laundering machine.
Figure 13 is a diagrammatic view showing the control cams and the electrical circuit arrangements produced by the same during the cycle of operation of the machine of the present invention.

The features of the present invention can best be understood by a preliminary discussion of the operating cycle thereof taken in connection with Figures 12 and 13. Figure 12 is a diagram indicating the condition of the cam actuated switches controlling the energization of the various elements identified thereon at the various times in the operating cycle, these times being identified by the indications in the "minutes" line of the diagram. It will be understood, of course, that an element may be indicated as energized on the diagram of Figure 12 when in fact some other portion of the energizing circuit is open and for that reason the element does not operate.

The cycle control switch 36, shown diagrammatically in Figure 13, may, for example, comprise a plurality of cams, 122, 106, 64, etc. with associated switches 126, 114, 68, etc. in cooperative engagement therewith for opening and closing movements as the cams are rotated. The cams are mounted on a common insulated shaft 50 which is driven by the timer motor 108 which, for the particular embodiment of the present invention here described, is a synchronous alternating current motor capable of rotating the shaft 50, one revolution in approximately 45 minutes. The cams 122, 106, 64, etc. are aligned relative to the shaft 50 to provide the desired sequence of control and the knob 44 is provided with suitable markings to indicate the point on the operating cycle to which the shaft 50 is aligned or set.

In the view of Figure 13, the shaft 50 and the associated cams are rotated by motor 108 in the direction indicated by the arrows 50a and the shaft is shown as rotated to the position corresponding to the beginning of the period identified at A, Figure 12, this period being the preliminary period during which used suds are returned to the hub T to provide wash water for a subsequent cycle of operation.

Assuming that the laundering machine is to be started from an unenergized condition and the storage reservoir provided to retain used suds is empty, the knob 44 is rotated to the position corresponding to the beginning of the "fill" period and is then depressed to close the single pole switch indicated generally at 46. This switch may, for example, comprise a conducting disk 48, attached to the insulated shaft 50 of the switch 46 for cooperative engagement with the two contacts 52. These contacts are mounted in a common plane perpendicular to the axis of the shaft 50 and are located relative to the length of this shaft at a point such that when the shaft is depressed the contacts engage the disk 48 and thereby provide a closed circuit for the passage of electrical current.

When the knob 44 is rotated to the condition corresponding to the beginning of the "fill" period, the switch 66 rides in the notch 62a of the cam 62 and the switch 68 rides in the notch 64a of cam 64. Switch 68 thereupon drops down to connect conductor 70 to conductor 72 and the switch 66 drops down to connect conductor 70 to conductor 74. Conductors 72 and 74 are connected to switches 76 and 78 which in turn are connected to the mix water solenoid 80 and the hot water solenoid 82, respectively. These solenoids are connected on their opposite ends to the conductor 84 which is in electrical connection with the prong 56b of plug 56.

The conductor 70 is connected to the conductor 60 through the float switch 86 which is in the position shown in Figure 12 when the liquid level in tub T is below a predetermined level, thereby connecting conductors 88 and 70. Thus when the unit is energized by depressing the knob 44, the solenoids 80 and 82 are connected to the source of electrical energy through the switches 76 and 78, respectively, the former being connected in circuit through the switch 68 and the latter through the switch 66.

The switches 76 and 78 are actuated by cams 92 and 94, respectively, and which are mounted on the insulated shaft 96 of the temperature control switch 38 to which knob 42 is connected. This knob may be rotated to any one of three positions, a first position corresponding to closure of both switches 76 and 78 (the position indicated in Figure 13), a second position corresponding to closing of switch 76, and a third position corresponding to closing of switch 78. This action is achieved by providing notches 94a and 94b in the cam plate 94 and notches 92a and 92b in the cam plate 92, the notches 94b and 92a being aligned relative to the shaft 96 so that when the knob 42 is in the position indicated diagrammatically in Figure 13, switches 78 and 76 ride in these notches and are closed to energize both solenoid 80 and solenoid 82. When the knob 42 is rotated to align notch 94a with the switch 78, only solenoid 82 is energized and when knob 42 is rotated to align notch 92b with the switch 76, only solenoid 80 is energized.

The physical structure of the solenoids 80 and 82 is shown in the rear elevational view of Figure 2. As is evident from this figure they are mounted above the temperature control valve 98. This valve includes hose couplings 98a and 98b to receive hose connections to sources of hot and cold water, respectively, and is connected to a hose 100 which supplies water to the tub T through the hoop-shaped tube 102. When electric current is caused to flow through "mix" solenoid 80, for example, a movable plunger is raised by the magnetic forces associated with the current flow and a fluid operated valve in the unit 98 connects the couplings 98a and 98b to the hose 100 through a fluid mixing chamber and the relative quantities of fluid flowing from these couplings to the hose 100 are regulated by temperature sensitive elements in the valve 98 to a relatively low temperature to cause relatively cool water to flow into the tub T. On the other hand when the "hot" solenoid 82 is energized with electric current, the coupling 98a, which is attached to a source of hot water (not shown), is connected to the hose 100 to cause hot water to flow into tub T. When both solenoids are energized, water of intermediate temperature passes into the tub T.

From the foregoing it will be seen that when the knob 44 is depressed to energize the mechanism at the start of the laundering cycle, liquid of temperature regulated in accordance with the setting of the temperature control switch 38 flows into the tub T. When the required amount of water passes into the tub, the level control switch 86 disconnects conductors 88 and 70, Figure 8, and thereby causes this fluid flow to discontinue.

When the fluid level in the tub T rises to the point where level control switch 86 disconnects the conductors 88 and 70, the conductors 88 and 90 are connected with the result that motor 54 is energized through the circuit which can be traced from the prong 56a of plug 56 to conductor 58, switch 46, conductors 60 and 88, level control switch 86, conductors 90 and 104 through motor 54 and finally back to prong 56b through conductor 84. Moreover, the cam switch 110 in the "fill" and "wash" condition (Figure 12) is in the closed position because notch 112b of cam 112 bears thereagainst during this period. This completes the electrical circuit from conductor 104 (which is energized through the level control switch 86), switch 110, agitator solenoid 109, and conductor 84. As will be described in further detail hereafter, current flow through solenoid 109 causes engagement of mechanical elements which drive the agitator 24, Figure 4, from the motor 54 to cause the former to execute oscillatory or reciprocating clothes washing movements. Thus, upon completion of the filling of the tub T, the agitator is energized to wash clothes contained in the basket 22.

When the fluid in the tub T actuates the fluid control switch 86, the timing motor 108 is energized through the circuit comprising this switch, conductors 90 and 104, motor 108, conductors 110 and 112, suds pump motor 124, and conductor 84 to prong 56b of plug 56 and from prong 56a of plug 56 to conductor 58, switch 46 to conductor 88 and switch 86. Since timing motor 108 is only large enough to produce the limited torque required to rotate the shaft 50, its current requirements are very small as compared to those of the suds pump motor 124. Hence, motor 108 operates as if connected directly to the line and thus drives the shaft 50 in the direction indicated to cause the operating cycle to progress. The relatively small current flow through motor 124 is insufficient to produce significant torque and consequently suds pump motor 124 does not tend to operate.

During the first ten minute period identified as "fill," Figure 12, the above described conditions prevail and the agitator operates when the tub T is full. Upon completion of this period, the switches 66 and 68 ride out of the notches 62a and 64a in cams 62 and 64, respectively, and open to disconnect conductors 72 and 74 from conductor 70. In addition, the switch 114 rides in the notch 106a of cam 106 to connect conductor 60 to conductor 104 to render the operation of motor 54 and timer motor 108 independent of the operation of level control switch 86 and the quantity of water in the tub T.

Upon completion of the "wash" period which may, for example, extend for a ten minute period after the "fill" period, a "drain" period of, for example, six minutes follows. At this time the switch 110 rides out of notch 112b of the cam 112 and opens to deenergize the actuator solenoid 109. As will be described in further detail hereafter, this causes the agitator 24 to be mechanically disconnected from motor 54 to discontinue the oscillating movements thereof and at the same time mechanically engage motor 54 and the auxiliary pump 128, Figure 4, to cause the latter to rotate in a direction to pump fluid out of the tub T.

Since the operation of the agitator 24 is independent of the level of the fluid in the tub T during the last ten minutes of the "wash" period, the laundering machine may be operated with a reduced quantity of water by manually turning the knob 44 to a position in the "fill" period, and depressing the knob to cause the valve solenoids 80 and 82 to be energized in accord with the water temperature desired to cause water to flow into the tub T. When the desired quantity of water is in the tub, the knob 44 may be manually rotated to a position beyond the "fill" period but still in the "wash" period to deenergize the valve solenoids 80 and 82 and cause the agitator to operate despite the fact that the level control switch 86 is not lifted. In this manner small quantities of clothes may be washed without requiring the time or water necessary for a full quantity of clothes.

During the "suds drain" period the switch 118 rides in the notch 120a of cam 120 and closes to actuate the two-way valve solenoid 116. As will be described in further detail hereafter, the resulting current flow in solenoid 116 causes the two-way valve to connect the tub T with the storage reservoir provided to hold the used washing suds. Consequently, the operation of pump 128 causes water to be pumped out of tub T and into the storage reservoir.

During the last portion of the "suds extract" period, the extractor solenoid 130 is energized by the circuit through conductor 132 and switch 126, the latter being rendered conducting when it rides on the notch 122b of cam 122. As will be described in further detail hereafter, energization of the extractor solenoid 130 causes the basket 22 to be mechanically connected to the motor 54 through a slip clutch assembly which limits the torque exerted on the motor and associated parts of the drive mechanism.

During a short interval of the "suds extract" period, as, for example, the minutes twenty-four and twenty-five (Figure 12), the cam 134 is positioned to align the notch 134a with the switch 136 and thus permit that switch to descend and make contact when the face of the auxiliary cam 134a rides against switch 136. The latter cam is driven by suitable driving elements (not shown) to rotate one revolution per minute and hence execute two revolutions in the two-minute period the notch 134a is aligned with the switch 136. The flat face of cam 134a is shaped to permit switch 136 to close during only a short period as, for example, 7 seconds of this time, thus causing the clothes to be sprayed only a relatively short period of time. The spray water is relatively cool fresh water obtained from the temperature control valve 98 when only the solenoid 80 is energized and washes the wash water off of the clothes or other objects contained in the tub T.

Toward the end of the extract suds period, at a time which may, for example, be at the conclusion of the twenty-six minute interval, Figure 12, the cam 106 has rotated beyond notch 106a and opens switch 114, thereby disconnecting motor 54 from the source of energizing power since the level control switch 86 is in the down position shown in Figure 13. At this time, the cam 134 has rotated to align cam 134b with switch 136 and energize the "mix" solenoid 80 through the circuit which can be traced through conductor 138, conductor 70, level control switch 86, conductor 88, conductor 60, switch 46 and conductor 58 to prong 56a of plug 56. During this time fresh warm rinse water flows into the tub T and all other operations, including rotation of shaft 60 by timer motor 108, are discontinued.

When the tub T fills, the level control switch 86 shifts to connect conductors 88 and 90 to energize timer motor 108 and motor 54 through conductor 104. Shaft 50 then rotates and the agitator solenoid becomes energized by reason of the alignment of the notch 112a of cam 112 with the switch 110. This causes agitator 24, Figure 4, to execute oscillating motions to rinse thoroughly the clothes contained in the basket 22.

After about two minutes agitation, which may, for example, terminate at minute 28, Figure 12, the "drain rinse water" period commences. At this time the switch 110 no longer rides in the notch 112a of cam 112 and opens to deenergize the agitator solenoid 109 to cause the agitator to be mechanically disconnected from motor 54 and discontinue the oscillating motions thereof. Deenergization of agitator solenoid 109 further causes the motor 54 to be mechanically engaged with pump 128, Figure 5, as is described in further detail hereafter, and causes this pump to rotate in direction to withdraw water from tub T. Since the two-way valve solenoid 116 is not energized during this period, the interior of the tub T is in fluid communication with the drain pipe (not shown) through the pump 128 and the two-way valve and rotation of the pump 128 causes the water to be pumped from the tub T to the drain pipe.

Approximate two minutes after the foregoing draining operation commences as, for example, at minute 31, Figure 12, the "extract rinse water" period is started. At this time, the switch 126 rides into the notch 122a in cam 122 and thereby connects conductor 70 to the extractor solenoid 130. As will be described in further detail hereafter, this causes the motor 54 to engage the basket 22 through a slip clutch which operates to limit the torque exerted on the drive mechanism. The basket 22 is thereupon accelerated to a high rotational velocity as rapidly as the slipping ability of the clutch permits and water is driven out of the clothes therein by the centrifugal forces associated with the rotational motion.

If it should happen that the pump 128 does not quite remove all the water from tub T during the two minutes allotted for this action, overload of the drive mechanism is prevented by the slipping clutch interposed between the motor 54 and the basket 22. Moreover, the pump 128 continues in operation and when the water is removed the drive mechanism is then capable of accelerating the basket 22. During the "drain rinse water" and "extract rinse water" periods the pump 128 continues to rotate to remove any water in the tub T.

At the beginning of the "extract rinse water" period as, for example, minute 31, the notch 134d rides against the switch 136 to energize solenoid 80 when the flat face of the cam 134e rides against that switch. This causes a spray of about 7 seconds' duration during the one-minute period when the notch 134d is aligned with the switch 136.

Upon completion of the "extract rinse water" period, the entire unit is shut off when cam 106 rotates to the point wherein switch 114 rides out of notch 106b and is opened. The cover 34 of the tub T may then be removed and the laundered clothes taken out of the unit.

When it is next desired to operate the machine, the cycle control switch 36 may be placed in the position corresponding to the region identified at A, Figure 12, which is the suds return condition. At this time the suds pump 124 is energized through the conductor 112, the closed switch 126, and the conductor 88, switch 126 connecting conductors 70 and 112 in this period by reason of the fact that it rides on the nib 122c of cam 122. The two-way valve solenoid 116 is energized at this time through switch 118 which rides in the notch 120b of cam 120, thus shifting the two-way valve to connect the storage reservoir with the tub T and thereby enabling the suds pump to draw water from the storage reservoir to the tub T and fill the latter.

During the time the cycle control switch is in the position indicated at A, Figure 12, the timing motor 108 is energized through the circuit including conductor 66, conductor 88, level control switch 86, conductor 70, switch 126, conductor 112, conductor 110, motor 108, motor 54, and conductor 84 to the prong 56b of the plug 56. Since the motor 54 has a horsepower rating greatly in excess of the rating of the timing motor 108, the impedance of the windings thereof is extremely small as compared with the impedance of the windings of timing motor 108 and substantially the entire line voltage appears across the latter motor and causes it to rotate the shaft 50 to cause the cycle of progress. The motor 54 does not operate during this period because the relatively small current flow through the windings thereof is insufficient to develop significant torque therein.

The foregoing conditions prevail so long as the switch 126 rides on the nib 122c of cam 122, a time period that may, for example, continue for three minutes. If this time period expires before the tub T is filled, the "fill" period, Figure 12, begins and the cycle previously discussed commences, the first step in the operation being the addition of fresh water through the temperature control valve 98, Figure 2, to cause the level of the water in the washer to rise to the level fixed by the level control switch 86.

In the event the level of the water rises to the level fixed by the level control switch 86 while the suds pump 114 is operating, the level control switch 86 connects conductors 88 and 90 to cause the agitator solenoid 109 to be energized through switch 110 which is in the closed position during this time because it rides in the notch 112b of cam 112. Clothes washing operations then commence and the laundering cycle progresses as previously described.

*Structure*

The main drive motor 54 is mounted on a bracket 54b attached to the rear portion of the vertical support member 150, seen in cross-section in the upper right hand portion of the view of Figure 5. The motor, together with the support member 150 may also be seen in the rear view of Figure 2 and, as will be further evident from this view, it is mounted in a pair of elongated slots 150a by support bolts 54g. As will be evident from Figure 5, a pulley 54c is attached to motor 54 and engages the belt 152 which encircles the actuator drive pulley 154, the pump drive pulley 156 and the extractor drive pulley 158.

The construction and operation of the agitator drive mechanism will best be understood by reference to Figure 6, which is a top plan view of the housing 160, Figure 5, with the top portion removed. As will be evident from this view, the shaft 154a upon which pulley 154 is mounted is shaped to form a pinion inside housing 160 and drives the bull gear 162 which is in turn supported on shaft 162a. A connecting link 164 is pivotally attached by pivot 164a to gear 162 and by pivot 164b to the sector gear 166 located in the opposite end of housing 160. This causes sector gear 166 to execute oscillatory motions as the pinion 154a is rotated by pulley 154.

The sector gear 166 is mounted upon shaft 168 which engages shaft 168 which extends through the housing 160 and supports the control unit 170, Figure 5, upon its open end. The sector gear 166 further engages the pinion 172 which is splined to shaft 174, which shaft extends upwardly to form the inner shaft of the tub T, Figure 4.

The pinion gear 172 has a plurality of notches 172b at its lower hub portion. The pins 172c are normally received in these notches for driving shaft 174 from pinion 172. This mechanism is best seen in the cross-sectional view of Figure 7, which is taken along axis VII—VII, Figure 6, and shows shaft 174 in elevation with pinion 172 thereon. The sector gear 166 may be seen in elevation behind and to the left of the pinion 172. As will be evident from this view, together with the plan section view of Figure 6, the upper hub portion of pinion 172 is provided with a peripheral recess 172a which mates with the bifurcated end portion 178a of the operating arm 178, which arm is supported from the shaft 180. The shaft 180 rests in the recess 160a of housing 160 and bears an opening or slot 180a to accommodate the operating arm 176, which may be seen in cross-section in Figure 7. The shaft 180 is provided with a roller 180b which rides on the arm 176 to minimize friction as arm 176 is shifted. Thus when the operating arm 176 lifts the shaft 180, the pinion 172 is likewise lifted by the arm 178 and is shifted out of engagement with the pins 172c, thereby discontinuing oscillation of shaft 174. On the other hand, when the shaft 180 is free to fall to the position shown in Figure 7, the notches 172b of pinion 172 engage the pins 172c to drive shaft 174 and the agitator 24 in reciprocating or oscillating clothes washing or rinsing movements.

In addition to controlling the driving engagements between sector gear 166 and the shaft 174, the operating arm 176 engages or disengages the pump 128. This operation is achieved through the crank 182 and the links 183 and 183a, Figure 5, which couple this arm to the rocker arm 184h which rotatably supports idler pulley 186h on its remote end. When the arm 176 is in the position shown in Figure 5, the rocker arm 184h is rotated to swing idler pulley 186h to a retracted position where it does not engage belt 152 and permits that belt to pass over the pulley 156 without engaging that pulley. Thus pump 128 is not rotated. However, when the arm 176 is shifted toward crank 182 by the action of control unit 170, as will be described in further detail hereafter, the rocker arm 184h is rotated to cause pulley 186h to bear against the belt 152 and cause operation of the pump 128.

Figure 8:
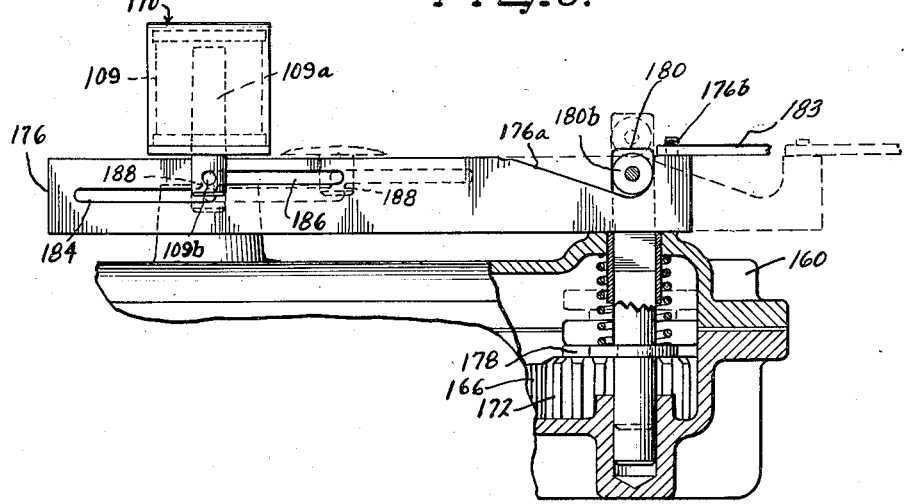
Figure 8 is a fragmentary cross-sectional view through the axis of VIII—VIII, Figure 6.

The position of the arm 176 is controlled by current flow in the actuator control solenoid 109 whose function has previously been described under "operation." The method by which this control is achieved may best be seen from the fragmentary side elevational and cross-section view of Figure 8, which shows the operating arm 176 in elevation and portions of the housing in cross-section, as seen from the axis VIII—VIII, Figure 6. As is indicated in this figure, the solenoid 109 is provided with a centrally disposed magnetic plunger 109a of iron or other magnetic material and upon which the pin 109b is mounted. The operating arm 176 has two parallel elongated slots 184 and 186 to receive pin 109b, these slots having their opposite ends abutting to form a vertical slot portion 188 connecting them. At its remote end, the arm 176 is shaped to form hooked notch portion 176a in which the shaft 180 may descend to permit pinion 172 to shift to an engaging relationship with the pins 172c. In addition, an upwardly extending pin 176b is located upon the upper surface of the operating arm 176, which pin rides in a corresponding opening in the link 182 to shift that link in accord with the movements of the operating arm 176.

It is the function of the foregoing mechanism to automatically shift the position of the operating arm 176 in accord with the current flow in the agitator solenoid 109. This shifting operation results from the fact that the control unit 170, Figure 5, executes reciprocating movements as the shaft 168, Figures 5 and 6, executes similar reciprocating movements under the driving action of the sector gear 166. These movements are dependent only on energization of motor 54. The backward extreme of movement of the unit 170 is shown in the solid lines of Figure 8 and the forward extreme in the dotted lines thereof. Current flow in the solenoid 109 causes the plunger 109a to assume a raised position in which the pin 109b rides in the upper elongated slot 186. As will be evident from Figure 8, the pin 109b can ride in slot 186 to execute the full reciprocating motion associated with the motion of the unit 170 while the arm 176 is in the retracted position shown.

If the current flow in the solenoid 109 is discontinued, the pin 109b falls into the lower elongated slot 184 when the unit 170 next reaches the position of maximum backward movement. Upon the succeeding forward movement of the solenoid 108, the pin 109b engages the forward edge of the vertical portion 188 of the slots and drives the entire arm 176 forward to the position indicated by the dotted lines of Figure 8. In this position, the shaft 180 is raised to disengage the pinion 172 from the pins 172c to discontinue the agitating movement of the agitator 24 and the link 182 is shifted forwardly to cause the rocker arm 184h, Figure 5, to swing idler pulley 186h into engagement with the belt 152 and drive the pump 128. Moreover, the elongated slot 184 is free in this condition to permit the full oscillating movements of solenoid 109 without further movements of arm 176.

If current flow is restored to the solenoid 109, the plunger 109a and the pin 109b are raised on the next forward movement of the unit 170, thereby causing the pin 109b to engage the back wall of the slot portion 188 and shift the arm 176 to the position shown in the solid lines of Figure 8 on the next succeeding rearward movement.

From the foregoing description it will be evident that when the agitator solenoid 109 is energized, the agitator 24 is driven in reciprocating clothes washing movements and the pump 128 is not mechanically connected to motor 54, and when the solenoid 109 is denergized no movements are imparted to agitator 24 and the pump 128 is driven from motor 54 by the belt 152.

It is the function of the operating arm 190 (Figure 5) to cause selective engagements between the driving motor 54 and the basket in accordance with the current flow in the extractor solenoid 130. To this end the extractor solenoid 130 is mounted on the control unit 170 to oscillate therewith and is provided with a plunger 130a having a pin to ride in a pair of elongated slots in the arm 190. These slots are like the slots 184 and 186 of arm 176 and operate to cause arm 190 to shift to a rearward position when current flows through the solenoid 130 and cause the arm 190 to shift to a forward position when no current flows in the solenoid 130.

At its forward end, the arm 190 is shaped to form a slot 190a, Figure 9, upon which the post 192 rides. The post 192 is supported from the housing 160 by the bracket 194 and is provided with a roller 192a to reduce the friction incident to shifting of arm 190. As will be evident from the figure, when current flows through the solenoid 130 and the arm 190 is shifted to the rearward position shown in the solid lines of Figure 9, the rod 192 assumes a lower position determined by the depth of the slot 190a whereas when no current flows through solenoid 130, the arm 190 shifts to the forward position shown in the dotted lines of Figure 9 and raises rod 192 to a position corresponding with the upper surface level of arm 190.

The pulley 158, as previously explained, is driven from motor 54 by belt 152, acts as a drive wheel for the basket 22 and is rotatably carried by the shaft 176 by the bushing and bearing 158a which rests on the bushing 158b. The flanged bell-shaped clutch member 194 carrying a ring of friction material 194a is slidably mounted relative to shaft 196 for limited axial movements to engage the pulley 158. This member is splined to the bushing 198 which in turn rides on shaft 196 and is held against rotation with respect thereto by the set screw 198c.

The bell-shaped member 194 is carried by the diamond-shaped yoke 200 which is mounted for limited angular movements about a pivot pin 202 supported on upstanding post 202a which is carried on housing 160. At its opposite end the yoke 200 encircles the pin 192b on the end of post 192. As will be evident from the figure, the yoke 200 may be swung downwardly to cause the clutch member 194 to engage the pulley 158 and drive the shaft 196. This is the position shown in the solid lines of Figure 9. On the other hand when the arm 190 is moved forwardly to raise the post 192, the bell-shaped member 194 is raised off the pulley 158 and the driving engagement is broken.

Spring 202b encircles the post 202 and bottoms at one end on a cotter pin 202c extending through the upper portion thereof and at the other end on the yoke 200 to provide a snug support for the yoke 200. Similarly, spring 192c encircles the portion 192b of the post 192 and bottoms against the under portion of the support plate 34 and the yoke 200 to provide a snug engagement between the yoke and post 192 to assure that the yoke 200 follows the up and down movements of the post 192.

The swingable suspension of the annular brake disk 204 from the yoke 200 may best be understood by reference to the cross-sectional view of Figure 9, taken in connection with Figure 10 which is a top plan view showing only these two members. As will be evident from these views, the disk 204 has opposed pin receiving extensions 204a which extend in the axial direction relative to shaft 196. Moreover yoke 200 is provided with a turned up portion 200a extending along each side thereof and having a pin receiving portion mating with the extensions 204a of the disk 204. Pins 205 are positioned in the extensions 204a of disk 204 and the turned up portion 200a of the yoke 200 pivotally to support disk 204 from the yoke 200. Thus, disk 204 is restrained against rotation with shaft 196 and follows the axial movements of the yoke 200.

It is the function of the annular brake disk 204 to engage the braking surface 208a of the collar 208 and simultaneously to lift that collar to raise the splined portion 194b of the clutch member 194, as shown in Figure 11. The clutch member 194 follows these upward movements by reason of engagement of the snap ring 194c secured to the splined portion 194b thereof and the upper edge of collar 208. This relieves the downward pressure exerted by the spring 210 against the collar 208 and the clutch member 194 and disengages pulley 158 and the clutch member 194. Since the collar 208 rotates with the shaft 196 and the disk 204 is fixed against rotation, the axial pressure exerted by the disk in overcoming the force of springs 210 causes frictional engagement between disk 204 and the friction surface 208a of collar 208 to oppose any movements of the shaft 196 and thus brake the basket 22.

When the yoke 200 is in the lowered position shown in the solid lines of Figure 9, the disk 204 swings free of the collar 208 and the latter is forced down on the seat 209 by the action of springs 210, thereby forcing the clutch member 194 against the upper surface of pulley 158 to cause the latter to drive shaft 196.

The collar 208 is in splined engagement with the upper splined portion 194b of the clutch member 194 and consequently rotates with that member and the shaft 196. It is provided with the brake surface 208a on its bottom portion to engage the disk 204 and has a plurality of cups 208b, Figure 5, to receive the springs 210. In the particular structure shown in the figures, a total of four springs 210 and a corresponding number of cups 208b are provided as will be seen from Figure 5, which is a view looking down on the collar 208. The bushing 198 is likewise provided with a plurality of cups 198a to receive the opposite ends of the springs 210. These springs, bottoming against bushing 198, which is fixed axially to shaft 196 by the set screw 198c, and against collar 208, force the collar 208 against the seat 209 of the bell member 194 as previously described and thus cause frictional engagements between the friction surface 194a of the clutch member 194 and the pulley 158.

The upper surface of the bushing 198 is surfaced with an annular friction disk 198b. This disk rides against the lower portion of the central post 206 and opposes lifting of shaft 196. In addition it forms a supplementary brake against the latter when the axial pressure exerted by the disk 204 is sufficient to overcome the weight of the basket and other elements suspended on shaft 196.

The pump 128, Figures 4 and 5, is connected by hose 210 to sump 212 which is in fluid communication with the interior of the tub T. The opposite side of this pump is connected by hose 214 to pump 224 which is connected to housing 216 which defines a fluid chamber in communication with the two-way valve 218. This housing is best seen in the side elevational view of Figure 4.

The two-way valve 218 is provided with hose couplings 218a and 218b, one of which is connected to a storage container such as a laundry tub and the other of which is connected to a drain. The valve 218 is constructed normally to connect the chamber defined by member 216 with the drain, but when current flows in the solenoid 116 the linkage 220 shifts the rocker arm 222 and connects the chamber defined by member 216 to the storage container.

The chamber 216 is further in communication with the suds pump 224 which is electrically connected, as indicated in Figure 8, and which is operated in timed sequence as previously explained. The chamber 216 provides priming fluid for this pump and enables it to pump fluid back into the tub T through the hose 214, pump 128, hose 210 and sump 212.

One of the features of the present invention resides in construction of the base plate 34 of the support structure S to sustain all the various operating elements, including the switches 36 and 38 and the temperature control valve 98, and as well as the cylindrical tub T. To this end the plate 34 is shaped to form a semi-circular forward portion 37, Figure 15, of radius corresponding to the radius of the cylindrical tub T to blend with or meet the forward portion of the tub and form an attractive overall structure, and a rectangular rear portion 39, which extends behind the tub T to define a surface upon which the various operating elements may be mounted. The support or base plate 34 is mounted upon the four mounting posts 150, 150a, 150b, 150c, and 150d which may be seen in cross-section in Figure 5 and from which plate 34 is sustained in fixed position to support the various elements mounted upon it. A semi-circular shroud 151, Figure 1, forms a skirt about the semi-circular forward portion 37 of member 34 and meets the outer surface of the tub T to form a neat, attractive, structure. The shroud 20, Figure 1, covers the rear portion 39 of member 34 and defines a relatively flat upper surface 40 which forms a mounting surface for knobs 42 and 44.

A plurality of upstanding portions 34a are pressed in base plate 34 and rise above the general level thereof to form seats upon which the outer portion 28 of the tube T is mounted. This mounting is achieved by a plurality of screws 35, Figure 4, which seat on waterproof washers 35a. The outer portion 28 of the tube T extends inwardly at its under portion 28a and is attached to the central post 206 by a plurality of bolts 28b positioned at intervals about the inner periphery thereof. These bolts pass through openings in the flanged bottom portion 206a of the post 206 and engage correspondingly threaded portions of the support plate 34 to form a rigid attachment between plate 34 and the post 206.

The base plate 34 is further provided with a plurality of downwardly extending stamped depressions 33, Figure 15. These extend radially about the axis of shaft 174 and impart further rigidity to the plate 34. One of the depressions is seen in cross-section in the view of Figure 9.

A further feature of the present invention resides in the use of hook-shaped pipe 102 which is connected to the fluid temperature control valve 98 by hose 100. As shown in Figure 2, this pipe extends over the edge of tube T and projects downwardly over the opening formed in the upper housing structure 26 inside the upturned portion 26a which may be seen in elevational view in Figures 2 and 4. This pipe defines a passage for water flow from the source of clean water connected to control valve 98 and which opens at a level well above the maximum water level in the tube T so that the fluid therein never comes in contact with this passage. Consequently, if disturbances in the water supply system cause a subatmospheric pressure to exist in the source of clean water, there is no possibility of back flow of dirty wash water from the tub T to the clean water supply. It is thus impossible to contaminate the source of clean water.

The shroud 20, Figure 1, which covers the control valve 98 and the hose 100, has a housing 40a on its flat upper surface 40. This housing is shown in cross-section in Figure 4. This encompasses the hook-shaped pipe 102 in the region it passes over the edge of tub T and provides a neat, attractive, cover for the same.

The level control switch and the structure in cooperation therewith is best seen in the views of Figures 2 and 4, together with the cross-sectional views of Figures 3 and 4. As will be evident from these views, the level control switch is pivotally attached to the lever 226 which in turn is pivoted by cotter pin 226a to the downwardly directed float bell 228. This bell fits in housing 230 supported from the outside of the tub T and which is in communication therewith through opening 232. The bell 228 is weighted by the sleeve 228a, Figure 14.

When the fluid level in the tube T reaches the level of the opening 232, the fluid fills the housing 230 as well as the tub T. The rising fluid in this housing entraps air underneath the bell 228 and, as the fluid further rises, a lifting force is exerted on bell 228 by reason of the displaced water. This swings the lever arm 226 upwardly and causes level control switch 86 to change from the position shown in Figure 13 where it connects conductors 88 and 70 to the position where it connects conductors 88 and 90.

One of the features of the present invention resides in the selectively operable friction drive mechanism provided to drive the basket 22 from the motor 54. The basket 22, particularly when loaded with a full load of damp clothes, possesses a large moment of inertia and resists with relatively great torque any attempt to accelerate it quickly. Moreover, any water in the tub T opposes rotation and acceleration of basket 22 with relatively great torque. If a direct drive is made between the motor 54 and the basket 22 it would be necessary to use large expensive high starting torque and high pull out torque motors. Moreover, the whole mechanical system would have to be designed to withstand these relatively great torques during acceleration of the basket 22 during the extracting or drying operation. These difficulties are avoided by the slipping friction drive achieved through the clutch comprising bell member 194 and the pulley 158 as this mechanism merely slips when predetermined torque is exceeded. This slipping action limits the torque applied to the motor 54 and permits the use of a relatively small motor having limited starting and pull out torque. In one machine actually constructed in accordance with the present invention, for example, this clutch permitted the use of an inexpensive split phase induction motor instead of a relatively expensive capacitor-start induction motor.

The springs 210 that force the bell member 194 against the pulley 158 to produce the friction drive engagements for the basket 22 are chosen to have limited spring constants so that the maximum torque exerted on the pulley 158 when the clutch is engaged is well below the pull out torque of the drive motor 54.

The use of the slipping clutch drive for the basket 22 provides a further advantage in that the low level float control mechanism heretofore necessary in apparatus such as that of the present invention is rendered unnecessary. This mechanism is ordinarily required to prevent connection of the motor 54 to the basket 22 when the tub T contains water since any attempt to drive the basket under such conditions overloads the motor 54 and results in its stalling, with the consequent overheating of the motor burning of fuses, etc. The apparatus of the present invention eliminates such low level float control without encountering this difficulty since the clutch comprising bell member 194 and pulley 158 simply slips until the water level falls down to the point where the basket 22 can be accelerated.

Thus in the present invention a drive mechanism for the basket 22 is deliberately chosen to have limited torque capacity to obtain economies associated with a low capacity drive. By interposing the clutch formed by bell member 194 against pulley 158, and arranging the friction surface 194a and the spring constant of springs 210 limit the maximum torque transmitted thereby to a value less than the capacity of the drive, the drive is protected from overload and at the same time effective driving action is achieved. Moreover, it becomes unnecessary to use a low level float control mechanism in the machine since the clutch will slip to prevent overload of the drive during the time there is water still remaining in the tub T.

While we have shown a particular embodiment of our invention, it will, of course, be understood that we do not wish to be limited thereto since many modifications, both in the elements disclosed and their cooperative structure, may be made without departing from the spirit and scope of our invention. We, of course, contemplate by the appended claims to cover all such modifications as fall within the true spirit and scope of our invention.

What we claim as new and desire to secure by Letters Patent of the United States is:

1. In a combination washing and extracting machine for clothes and the like comprising a tub, a basket mounted within said tub for rotatable movement therein about a vertical axis, an agitator within said basket, drive mechanism for oscillatably driving said agitator including a vertical shaft having said agitator mounted thereon and extending downwardly beneath said tub and basket, other drive mechanism for spinning said basket including a sleeve encircling said vertical shaft and extending downwardly beneath the top of said tub and basket, a pulley freely mounted on said sleeve, a motor and drive mechanism driven therefrom for rotatably driving said pulley, and a selectively operable drive connection from said pulley to said sleeve for spinning said basket with a predetermined torque limitation comprising a clutch member encircling said sleeve and mounted for axial movement therealong and held from rotation with respect thereto, a yoke encircling said clutch member, means connecting said yoke with said clutch member for disengaging said clutch member from said pulley, a ring secured to said sleeve and having a friction disk thereon in juxtaposition to and facing the bottom of said basket, a second ring spaced beneath said first ring engaging said clutch member and held against rotation with respect to said clutch member and having a friction disk on the bottom surface thereof, a plurality of annularly spaced compression springs interposed between said rings for yieldably engaging said clutch member with said pulley and transmitting driving torque therefrom limited by the force of said springs, said means connecting said yoke with said clutch member for disengaging said clutch member from said pulley comprising a brake ring secured to said yoke and encircling said clutch member and held from rotation with respect thereto and movable by said yoke into engagement with said friction disk on the bottom of said second ring to release said clutch member and to hold said sleeve from rotation, and also moving said first-mentioned friction disk on the top of said first ring into engagement with the bottom of said basket upon further upward movement of said disk.

2. In a combination washing and extracting machine for clothes and the like comprising a tub, a basket mounted within said tub for rotatable movement therein about a vertical axis, an agitator within said basket, drive mechanism for oscillatably driving said agitator including a vertical shaft having said agitator mounted thereon and extending downwardly beneath said tube and basket, other drive mechanism for spinning said basket including a sleeve encircling said vertical shaft and extending downwardly beneath the top of said tub and basket, a pulley freely mounted on said sleeve, a motor and drive mechanism driven therefrom for rotatably driving said pulley, and a selectively operable drive connection from said pulley to said sleeve for spinning said basket with a predetermined torque limitation comprising a bushing secured to and extending along said sleeve beneath said basket, a clutch member encircling said bushing and splined on said bushing for slidable movement therealong and for rotating the same, said bushing having an enlarged diameter ring at its upper end portion having an annular friction disk on the upper face thereof in juxtaposition to and facing the bottom of said basket, a second ring spaced beneath said first ring and held in engagement with said clutch member and against rotation with respect to said clutch member and having a friction disk on the bottom surface thereof, a plurality of compression springs interposed between said rings for yieldably engaging said clutch member with said pulley and transmitting driving torque therefrom limited by the force of said springs, a yoke encircling said clutch member and having a brake ring transversely pivoted thereto and encircling said clutch member and moved by said yoke upwardly into engagement with said friction disk on the bottom of said second ring to raise said second ring and clutch member and disengage said clutch member from said pulley and also hold said second ring, bushing and sleeve from rotation and moving said friction disk on the top of said enlarged diameter ring into engagement with the bottom of said basket upon further upward movement of said disk.

PETER EDUARD GELDHOF.
    LUTHER RINGER.

REFERENCES CITED

The following references are of record in the file of this patent:

UNITED STATES PATENTS

| Number | Name | Date |
|---|---|---|
| 744,423 | Steckel | Nov. 17, 1903 |
| 1,097,691 | Wardwell | May 26, 1914 |
| 1,251,737 | Bartholomew et al. | Jan. 1, 1918 |
| 1,631,458 | Belden | June 7, 1927 |
| 1,789,940 | Geldhof | Jan. 20, 1931 |
| 1,965,379 | Jewell | July 3, 1934 |
| 2,109,620 | Kirby | Mar. 1, 1938 |
| 2,250,974 | Stoddard | July 29, 1941 |
| 2,301,046 | Henderson | Nov. 3, 1942 |
| 2,331,699 | Kirby | Oct. 12, 1943 |
| 2,331,897 | Dyer | Oct. 19, 1943 |
| 2,350,108 | Geldhof | May 30, 1944 |
| 2,356,817 | Breckenridge | Aug. 29, 1944 |
| 2,380,732 | Dunham | July 31, 1945 |
| 2,384,903 | Ferris | Sept. 18, 1945 |
| 2,391,561 | Geldhof et al. | Dec. 25, 1945 |